United States Patent
Bahr

(10) Patent No.: US 7,434,256 B2
(45) Date of Patent: *Oct. 7, 2008

(54) SECURITY MANAGEMENT FOR WIRELESS CLIENTS

(75) Inventor: Casey Bahr, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 712 days.

This patent is subject to a terminal disclaimer.

(21) Appl. No.: 10/742,225

(22) Filed: Dec. 18, 2003

(65) Prior Publication Data

US 2005/0135623 A1 Jun. 23, 2005

(51) Int. Cl.
*H04L 9/00* (2006.01)
(52) U.S. Cl. .................... 726/16; 726/5; 726/18
(58) Field of Classification Search ........... None
See application file for complete search history.

(56) References Cited

U.S. PATENT DOCUMENTS 7,042,988 B2 * 5/2006 Juitt et al. .............. 379/88.17

FOREIGN PATENT DOCUMENTS

EP 0398645 A2 11/1990

OTHER PUBLICATIONS

Boenigk, et al: A Basic Architecture for Mobile Informatiom Access; Computer & Graphics, vol. 20, No. 5, pp. 683-691; 1996.
PCT/US2004/040278 Int'l Search Report & Written Opinion.

* cited by examiner

*Primary Examiner*—Pramila Parthasarathy
(74) *Attorney, Agent, or Firm*—Blakely, Sokoloff, Taylor & Zafman LLP

(57) ABSTRACT

An Operations, Administration, and Maintenance (OA&M) 16 provides security for managed resources on a wireless client device 10 at many levels of granularity, from the entire device, to subsystems, to software and hardware components, services and applications, down to individual attributes.

9 Claims, 7 Drawing Sheets

SECURITY MANAGEMENT FOR WIRELESS CLIENTS

In terms of resources to be managed, handheld wireless devices such as cellular phones are typically viewed as an end point of a network and little or no management of these devices occurs. For instance, security protection for such devices to prevent malicious intruders from exploiting improperly secured or unsecured wireless LANs or WiFi networks typically has been nonexistent.

In contrast, in the Personal Computer ("PC") environment, the "terminal elements" are highly sophisticated, complex devices (servers, desktop PCs, laptops, and the like) with many levels of built-in security. In the PC environment, a rich platform management model and implementation has security features to better serve both administrators and protect end users.

These two environments, the wireless and PC worlds, are merging within new devices that offer both cellular communications and rich compute-intensive applications. As computational and communication abilities merge in more sophisticated and expensive wireless devices, security features and methods of security management become more desirable in the wireless space.

Thus, the ability to locally and remotely manage such security features and provide intrusion detection and prevention in wireless devices is needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
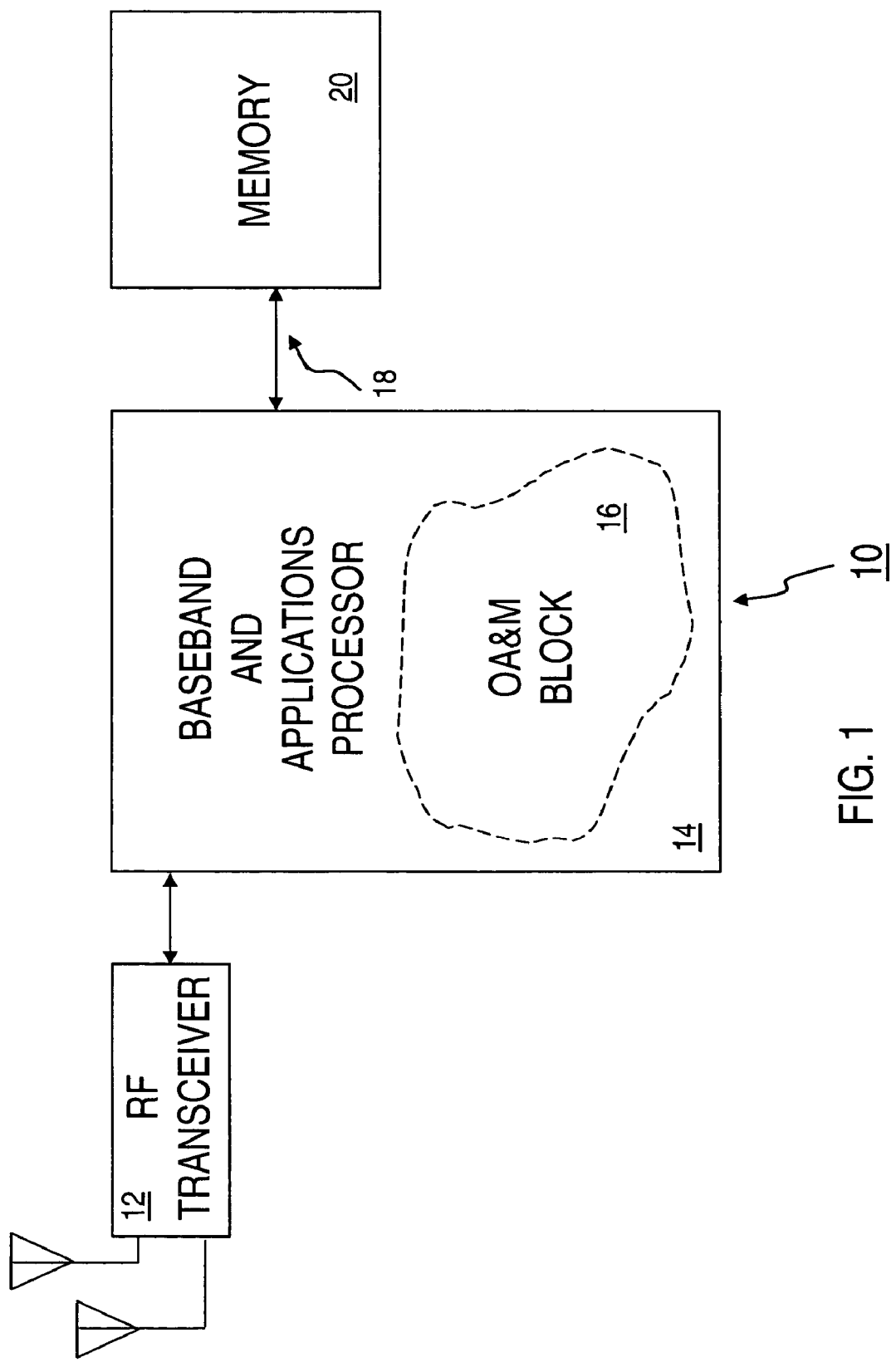
FIG. 1 illustrates security features of the present invention incorporated into a wireless communications device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Wireless communications device 10 has a transceiver 12 that either receives or transmits a modulated signal from one or more antennas. The analog front end transceiver may be provided as a stand-alone Radio Frequency (RF) integrated analog circuit, or alternatively, be embedded with processor 14 as a mixed-mode integrated circuit. The received modulated signal is frequency down-converted, filtered, and then converted to a digital signal. The digital data for the baseband signal processed by processor 14 may be transferred across an interface 18 for storage by a memory device 20. Memory device 20 may be connected to processor 14 to store data and/or instructions used by processor 14. In some embodiments, memory device 20 may be a volatile memory and in alternate embodiments, memory device 20 may be a nonvolatile memory.

The architecture shown in FIG. 1 for wireless communications device 10 includes security features of the present invention that may be used in a wireless product. As such, processor 14 includes an Operations, Administration, and Maintenance (OA&M) system 16 for wireless clients. OA&M denotes broad functionality classes across a wireless handheld platform. Operations refers to activities that provide services to the end user of wireless communications device 10 and the associated functions required to support those services, such as provisioning (of resources and services), performance management, account management, and billing. Administration is related to the management of components that deliver required levels of service, and thus is associated with concepts such as Quality of Service (QoS), performance management, and traffic management where applicable. Maintenance is subdivided into corrective maintenance and preventive maintenance. Corrective maintenance involves failure detection and recovery, whereas preventive maintenance is involved with the tracking and alerting of pending or possible fault conditions and the re-configuration of platform resources in that regard. OA&M system 16 includes various management systems or "managers" having hardware, software code and one or more objects to perform the desired functions.

The architecture presented for wireless communications device 10 may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. OA&M system 16 may be incorporated into these devices and encompass a layered system approach to the management of platform resources (e.g., devices, device or network components, peripherals, etc.). The resources to be managed on a handheld platform of wireless communications device 10 are commonly referred to as managed resources and are instantiated in software as Managed Objects (MOs).

Figure 2:
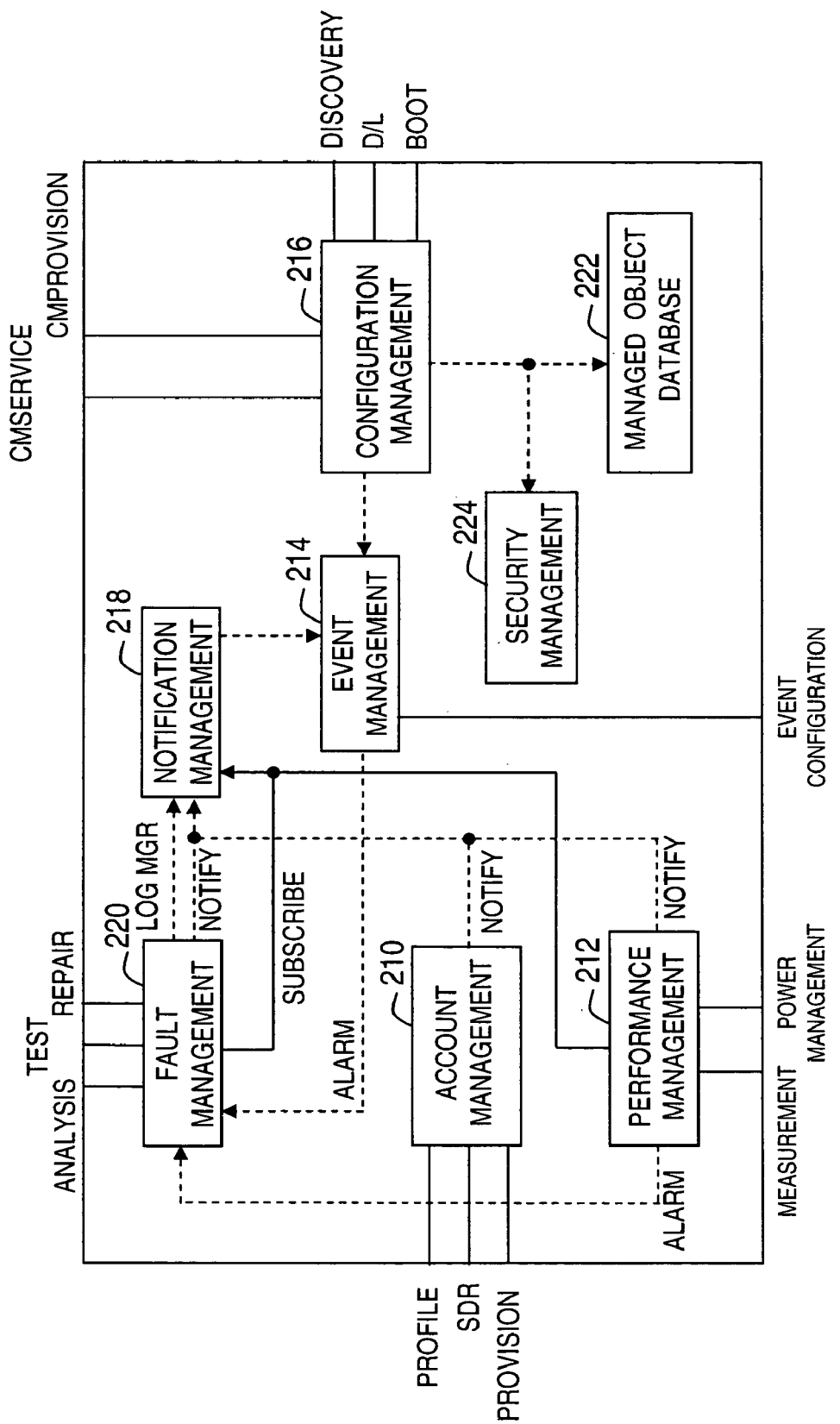
FIG. 2 illustrates a diagram of an embodiment for an Operations, Administration, and Maintenance (OA&M) block having security management for wireless clients in accordance with the present invention.

FIG. 2 shows one embodiment of OA&M system 16 which may be described based on its relation within wireless communications device 10. It should be pointed out that OA&M system 16 may be resident on the wireless communications device 10, or alternatively, portions of OA&M system 16 may be resident at a network location. OA&M system 16 may include an account management block 210, a performance management block 212, an event management block 214, a configuration management block 216, a notification management block 218, a fault management block 220, a managed object database 222 and a security management block 224. Although OA&M system 16 is shown and described having all of these blocks, other embodiments may have fewer blocks without limiting the claimed subject matter of the present invention.

Account management block 210 may record information pertaining to billing and communicate session detail records with a remote billing function.

Performance management block 212 may define functionality for end-user and business-level usage designed to achieve the highest levels of local and network performance, physical and logical configurations, preventative maintenance, avoidance of service outages, as well as measures of quality delivery from service providers and client applications operation.

Event management block 214 may provide a model for the capture and delivery of platform events, such as any instantaneous change in a managed object. These events may be the foundation upon which platform monitoring, performance tuning, fault management, power management, and configuration are built.

Configuration management block 216 may provide various operations to define and maintain configuration data. Data may be added to create new resources, data may be deleted to remove unused resources, and data relating to existing resources may be modified for resource optimization.

Notification management block 218 may be used to package and deliver event details to interested system components. Such information may include, for example, the Managed Object (MO) generating the event, its class and instantiation, the time of the event, and optional information related to the particular MO, its function, and relationships to other MO's in the platform, if applicable.

Fault management block 220 may detect alarms and faults as they occur and notify other components, subsystems, or human operators upon receipt; isolate faults and limit the fault's effects; use test routines, diagnosis and correlation techniques to determine the cause of the fault; and repair or eliminate failures using maintenance routines (or human intervention).

Managed object database 222 may contain files, tables, or other representations corresponding to each of the managed objects of OA&M system 16. The managed objects represent the platform resources managed by OA&M system 16. In order to aid understanding of the invention, a distinction will be drawn between the meanings of "managed resource" and "managed object". Managed resources are those real-world things within a system that one wishes to manage, that is, to create, modify, discover, or examine. In certain embodiments, these managed resources may include various hardware and software components (or portions thereof) including, for example, processor 14, memory device 20, other semiconductor devices, an operating program, a communications program, other software or firmware components, etc.

In order to manage these resources effectively and efficiently, representations of these resources are often embodied as managed objects. Managed objects are thus abstractions, usually in software, of the managed objects and represent the data and relationships contained within the managed resources.

Figure 4:
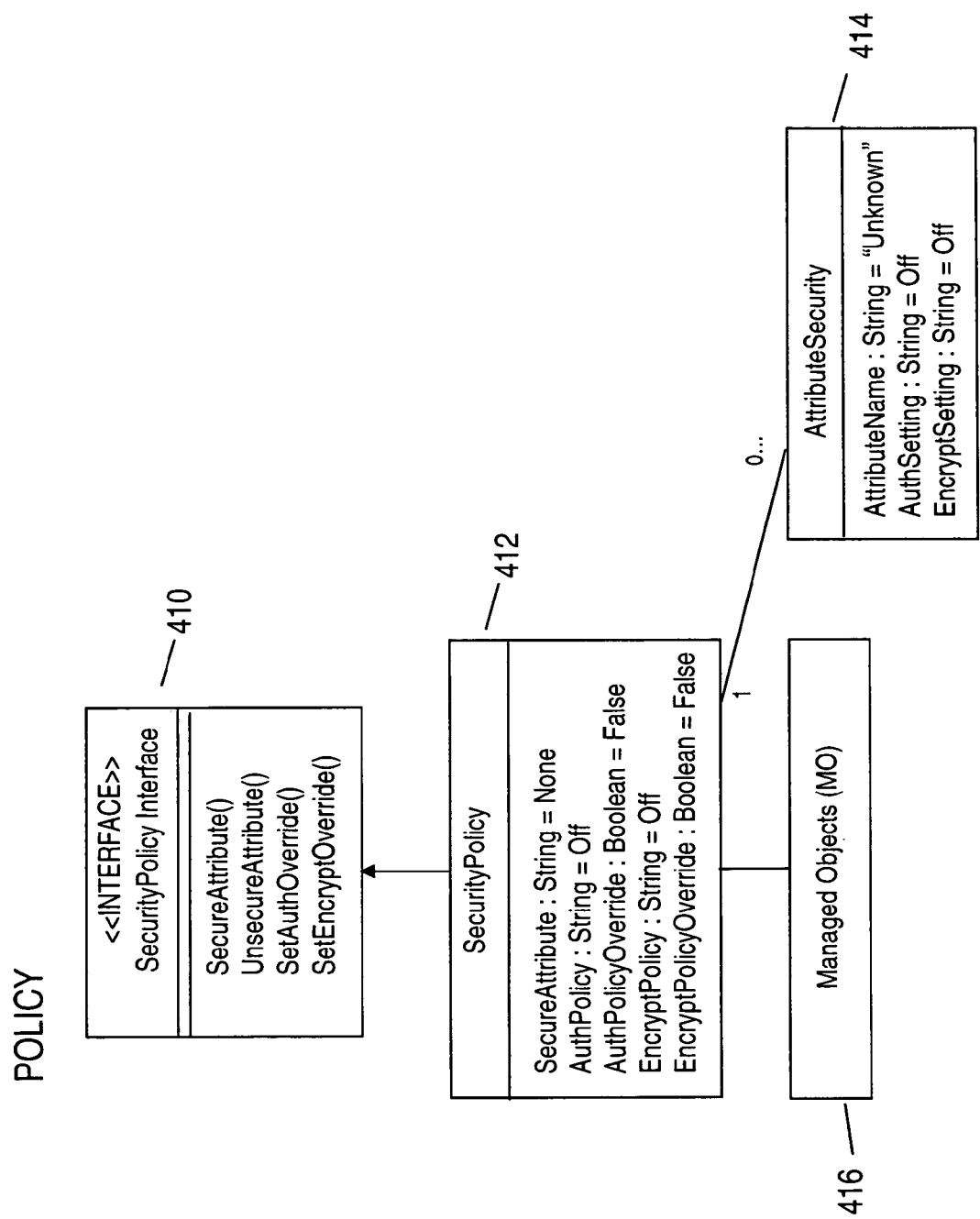
FIG. 4 shows details of the objects and interfaces of the security policy.

Note that though a single managed resource may be represented by a single managed object, this is not usually the case, since the managed resources are typically complex and require decomposition into multiple objects. Furthermore, additional managed objects may exist to, for instance, represent relationships amongst a managed resource's components or between separate managed resources. A glimpse of such complexity may be discerned in FIG. 5. In FIG. 4 and FIG. 6, the point above will aid understanding that the single block labeled "MO" is used to represent from one to a number N of actual managed objects.

It will be obvious to one skilled in the art that managed objects may take various forms and exist under the rules of specific schema, standardized or proprietary, but that various embodiments will have no effect on the practice of the invention described herein.

In accordance with the claimed subject matter, security management block 224 is an integral part of OA&M system 16 and provides a platform management security subsystem for wireless handheld devices. Security management block 224 may, in general, protect the OA&M managed resources from tampering or its data from disclosure to untrusted parties or unauthorized control operations.

Figure 3:
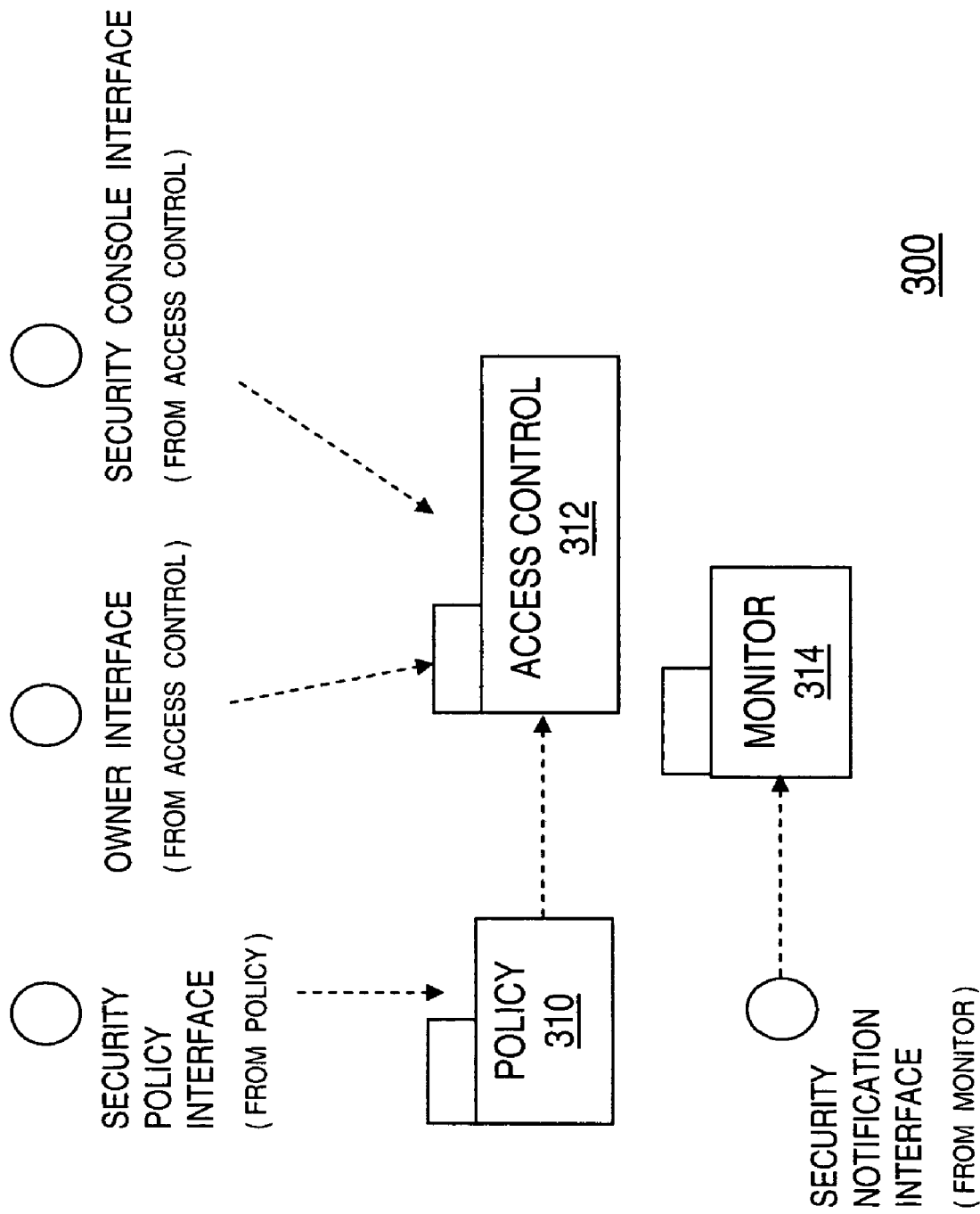
FIG. 3 illustrates the security policy, access control and monitor components of the security management system.

FIG. 3 illustrates the three components of a security management system 300 under the control of security management block 224; namely, a security policy block 310, an access control block 312 and a monitor block 314. Security policy block 310 sets the policy for authentication and encryption of the managed resources at the managed object and managed object attribute level. Security access control block 312 provides a mechanism for the authentication, delegation, and definition of access permissions for managed resources. Security monitor block 314 provides a reporting mechanism for security alerts, reporting events such as modifications or access to managed objects, new management authorization and information on any security key used to gain access. Propagation of such alarms depends on the OA&M system's alarm management facilities. With these components in wireless communications device 10, trusted users of the resources may be authenticated, access control of the resources may be protected, and data that is potentially accessible may be encrypted.

Referring now to FIG. 4, shown is a block diagram of managed objects and interfaces of security policy block 310 in accordance with one embodiment of the present invention. Security policy block 310 applies access control mechanisms to managed objects and sets policy for encryption of the managed objects data on and off the platform. The Application Program Interface (API) for security policy block 310 is a set of routines, protocols and tools for building software applications, and includes a SecurityPolicy interface 410, a SecurityPolicy 412, an AttributeSecurity 414 and managed objects 416 (from configuration management block 216) (see FIG. 2).

Security policy block 310 allows for the adjustment of security policies used for the purposes of authentication and encryption as supplied to the entire managed object to which the policy object is associated or individual attributes of the managed object. Note that a single managed object may be the root of a collection of managed objects that represent a managed resource. In this case, security management of resources may actually occur at three levels of granularity, namely, managed object collections, individual managed objects, and individual managed object attributes. The security policies that apply to authentication and encryption for managed objects or managed object collections are represented by SecurityPolicy objects associated to managed objects 416.

SecurityPolicy 412 contains policy attributes for each authentication and encryption which may be as simple as "Off" and "On" or a regular expression for more sophisticated applications of the policy to a particular managed object. SecurityPolicy 412 also contains attributes to override authentication and encryption policies for individual managed objects which indicate if the policy being applied is local to the managed object or collection, or inherited from the system or managed object collection.

For more fine-grained specification of security at the attribute level in some embodiments, individual attributes may be listed in AttributeSecurity 414, which creates individual attribute security objects with their own authentication and encryption settings. Individual settings may at any time be overridden by the global policies en masse. Managed object 416 may include name attributes, class attributes, parent and child associations and status attributes, with capabilities to create, initialize, delete, modify and query.

Figure 5:
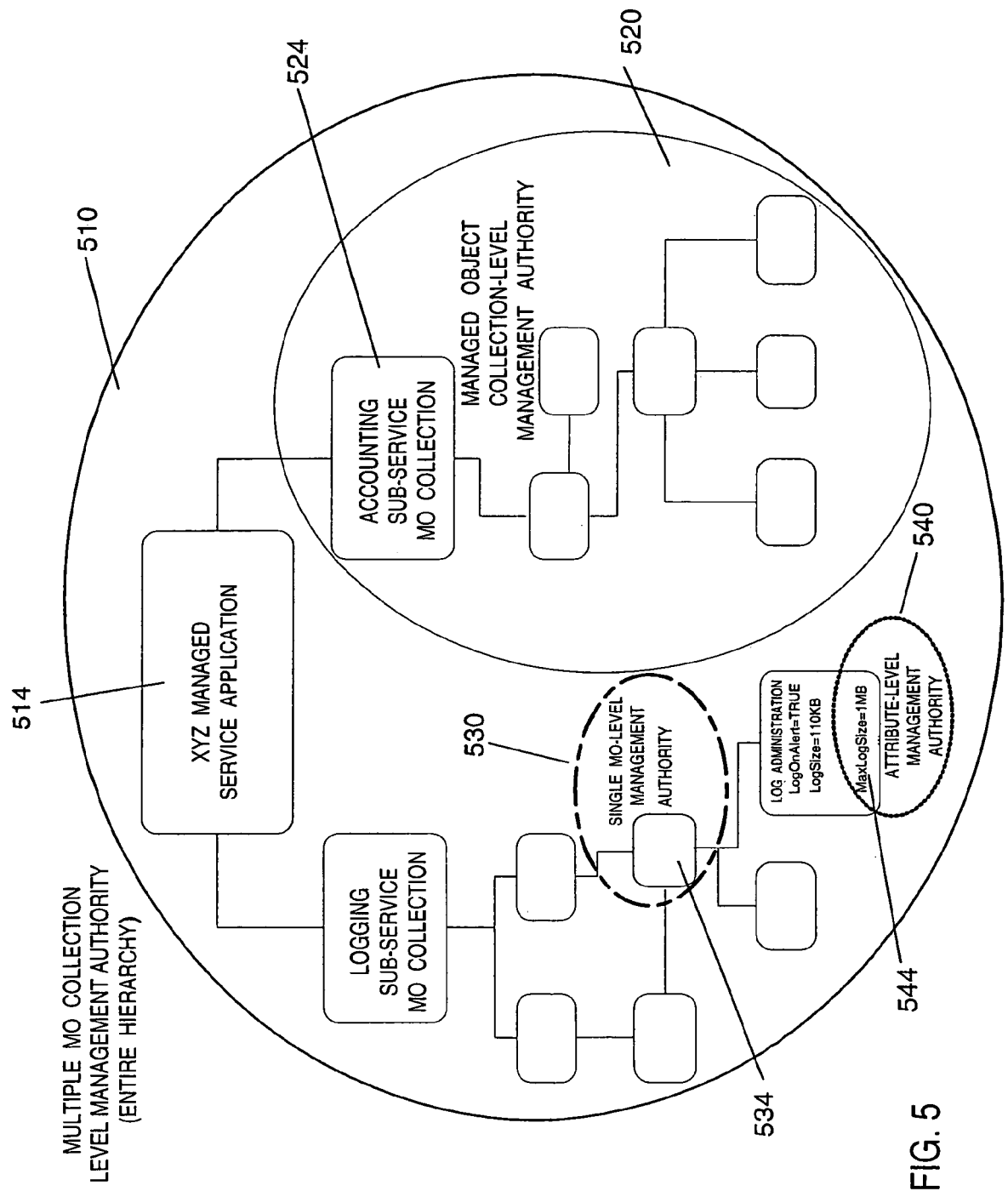
FIG. 5 is a block diagram illustrating multiple levels of managed object collections to which management security may be applied in accordance with the present invention.
Figure 6:
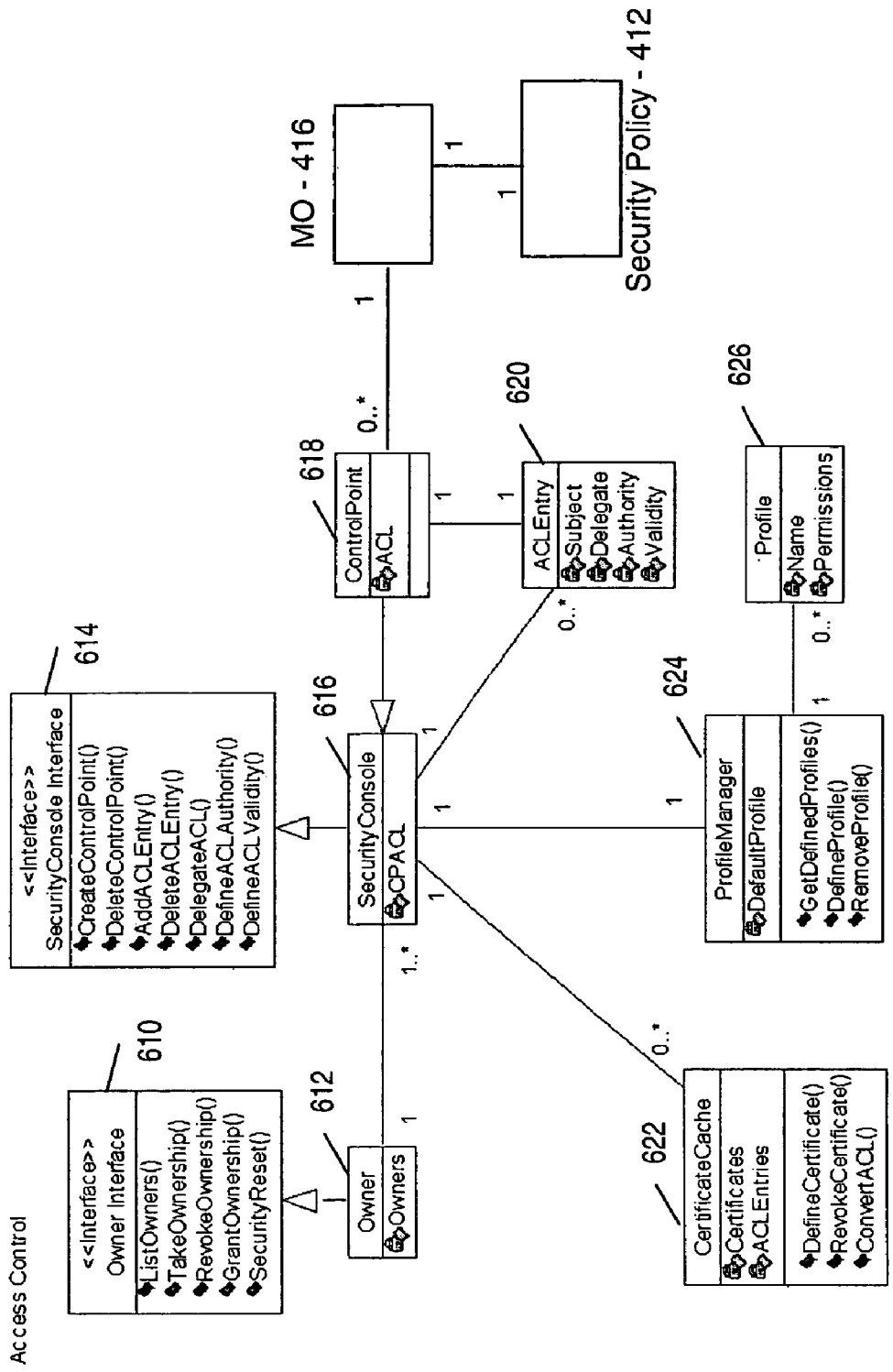
FIG. 6 shows details of the objects and interfaces of the access control.

FIG. 5 is a block diagram illustrating multiple levels of managed object collections to which management security may be applied in accordance with the present invention. In the diagram, each block represents a managed object. One or more managed objects may be necessary to represent a managed resource. Where there is more than one managed object to represent a managed resource, the managed objects are associated with one another in some manner (as represented by the lines between objects in the diagram). Different embodiments of a managed object representation may or may not allow or restrict such relationships to be, for example, tree-like hierarchies, cycles, collections, or other associations. The diagram is intended to explain the distinct levels of application of the invention in relation to the representation of the managed resources.

The example managed resource in the diagram is a service application that may be installed to run on the managed platform. This service has sub-functions of Logging and Accounting. The ellipses outline a single attribute 540, a single managed object 530, a collection of managed objects representing the accounting sub-function 520, the entire managed resource of the service application 510, and outline the four possible levels of application of security policy (authorization and encryption) that are possible with the present invention.

The scope of the security policy when applied to the "root" object of the entire service application 514 applies that policy to the entire set of managed object collections representing that application. When the security policy is applied to a sub-collection of the entire managed resource, such as 524, this is a single managed object collection policy. More specific security policy may be applied to, say, particularly sensitive managed objects individually, such as 534. The most specific application of security policy may occur at a single attribute level as well, as presented by the MaxLogSize attribute 544 within the Log Administration managed object in the example diagram.

FIG. 6 shows details of the objects and interfaces of security access control block 312 (see FIG. 3). Security access control block 312 includes an Owner Interface 610, a list of device owners 612, a SecurityConsole interface 614, a SecurityConsole 616, ControlPoints 618, an Access Control List (ACL) entry 620, a CertificateCache 622, a ProfileManager 624 and a Profile 626 that may implement permissions profiles as a convenience. SecurityConsole 616 interface controls the lifecycle of ControlPoints 618 and the creation of ACL entry 620 objects in the system. ProfileManager 624 interface governs multiple ControlPoints 618 that may be collected in a single Profile 626. Thus, Profile 626 and all associated ControlPoints 618 and ACL entry 620, etc. may be coalesced and defined, installed, or removed as a single entity. Access control decisions may be made by a combination of SecurityPolicy 412 (see FIG. 4) and control of access by the actions of SecurityConsole 616.

The API for Owner Interface 610 allows an initial SecurityConsole 616 to become the platform owner and delegate subsequent authority. If the device was already owned, the signature fails and the request is rejected without processing. The TakeOwnership( ) in Owner Interface 610 permits SecurityConsole 616 to obtain a public key for the platform and claim ownership of an unowned, security-aware device via the public signing key. As a result of a successful TakeOwnership( ) action, SecurityConsole 616 is listed as the device's Owner (see Owners in 612). An Owner is a ControlPoint 618 empowered to edit a device's Access Control List (ACL) entry 620. The Security Console's interface may assign names to Control Points 618 and grant them permissions on managed resources. Once ownership of a device is granted to SecurityConsole 616, it is possible for that Security Console to grant ownership through authority delegation to other Security Consoles.

The list of device owners 612 is the list of, or the security hashes of, those signature keys that are permitted to edit ACL entry 620 of the device. By default, each of these signature keys is given total permission to modify managed objects. Typically, there would be only a single owner of the device. Owners may designate Control Points 618, which according to their corresponding ACL entry 620 are granted less than full ownership privilege. This scheme allows the segregation of access to different areas of managed resources.

Each ACL entry 620 contains a signature key and one or more permissions granted. Permissions may be defined by the device manufacturer or resource providers and are comprised of a set of allowable actions. An ACL entry 620 may limit the delegation of authority from one Control Point 618 to another and the valid duration of such authority based on date and time limits. These features are represented in ACL entry 620 by the attributes Delegate, Authority, and Validity. Thus, as managed resources such as device components, software, user preferences, etc., get installed at manufacture time or later, entries in ACL entry 620 are created that correspond to the authority to manage those resources.

Since a wireless client platform may have a large number of resources or attributes protected by an ACL entry 620, SecurityConsole 616 may convert an ACL entry and replace it with a certificate in CertificateCache 622 to grant that permission to the Control Point 618. Since wireless communications device 10 may have limited storage capability for these entries, certificates are cached and associated with a Control Point for use when accessing managed resources.

Figure 7:
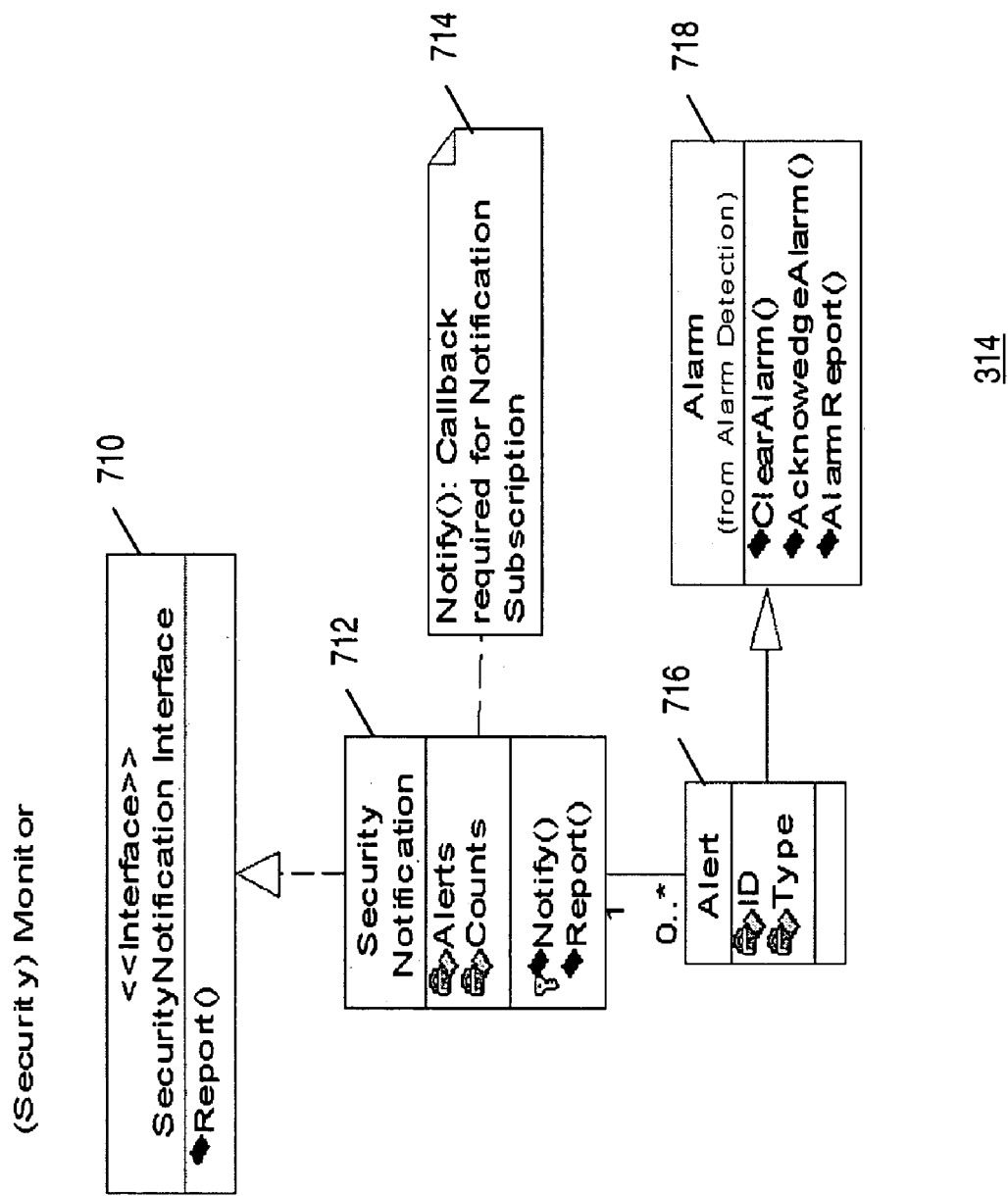
FIG. 7 shows details of the objects and interfaces of the monitor.

FIG. 7 shows details of the objects and interfaces of security monitor block 314 (see FIG. 3). Security monitor block 314 may include a SecurityNotification Interface 710, a SecurityNotification 712, a callback notification 714, an Alert objects 716 and an Alarm 718. SecurityNotification 712 is a subscription point for security related alarms, maintaining a collection of such alarms and supplying a reporting function on these alarms.

Security Management's monitoring function assumes the existence of an OA&M fault and alarm management system. It provides OA&M notifications of a Security Category. Due to the criticality of security notifications, the ability to sequester such alarms is expected. Security Alarms are defined within the client OA&M system and attached to the Security Monitor via a list of Alert objects 716 that track each alarm by ID and Type. The Security Notification interface provides a mechanism to report on the current security subsystem Alarms. Alarms are delivered via a Notify( ) call back which the OA&M Alarm subsystem calls.

By now it should be apparent that a method and architecture have been presented for providing security in a wireless communications device by protecting OA&M managed resources from tampering or its data from disclosure to untrusted parties or unauthorized control operations. The protection provided by the present invention allows trusted users of the resources to be authenticated, provides access control of these resources and provides encryption of data that is or is potentially accessible "in the clear".

Some of the key features of the present invention are an ability to define security for managed resources on a wireless client device at many levels of granularity, from the entire device, to subsystems, to software and hardware components, services and applications, down to individual attributes of the above. Furthermore, it includes mechanisms for the management of the access control and encryption specifications for these managed resources in profiles that can be applied to multiple managed resources at one time. The invention also encompasses the ability to monitor the "health" of the system by tying it to alarm capabilities within the overall OA&M device system.

Due to the relatively constrained environment of handheld devices, the invention allows for these security aspects to be implemented with efficiency in mind, for example, by permitting authentication and encryption granularity. Control of the applied security in the wireless device is provided to individual attributes on specific managed objects that are a sub-part of a single managed resource. In addition, the present invention supplies mechanisms for efficiently managing the representations of access control and profiles that manage collections of such access control representations.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A security system in a handheld device, comprising:
    an Operations, Administration, and Maintenance (OA&M) system on the handheld device, including:
    a list of device owners that designates one or more owners allowed to modify managed resources;
    an owner interface to enable the one or more owners to gain access to the managed resources; and
    a security policy module to set policies for authentication and encryption of the managed resources.

2. The security system of claim 1, wherein the OA&M system is capable of delegating authority from one owner to another.

3. The security system of claim 1, wherein the OA&M system has the ability to revoke ownership.

4. The security system of claim 1, wherein the OA&M system has the ability to designate complex sets of permissions.

5. The security system of claim 1, wherein the OA&M system collects owner specifications represented in profiles to simultaneously apply to multiple managed resources.

6. The security system of claim 1 wherein the OA&M system converts privilege profiles and access control information to security certificates.

7. A method, comprising:
    providing an Operations, Administration, and Maintenance (OA&M) system on a wireless device, wherein the OA&M system designates one or more owners to modify managed resources;
    monitoring a health function of security subsystem that utilizes alarm capabilities within the OA&M system, wherein an owner interface enables the one or more owners to gain access to the managed resources and
    a security policy module set policies for authentication and encryption of the managed resources.

8. The method of claim 7 further including maintaining a collection of alarms in a security notification to supply a report on the alarms.

9. The method of claim 7 further including providing a security notification interface in the OA&M system on the wireless device to provide a mechanism to report on the alarms.

* * * * *